US012695037B2

(12) United States Patent
Sato

(10) Patent No.: US 12,695,037 B2
(45) Date of Patent: Jul. 28, 2026

(54) VACUUM CIRCUIT BREAKER

(71) Applicant: Mitsubishi Electric Corporation, Tokyo (JP)

(72) Inventor: Motohiro Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 284 days.

(21) Appl. No.: 18/560,235

(22) PCT Filed: Jul. 21, 2021

(86) PCT No.: PCT/JP2021/027312
§ 371 (c)(1),
(2) Date: Nov. 10, 2023

(87) PCT Pub. No.: WO2023/002598
PCT Pub. Date: Jan. 26, 2023

(65) Prior Publication Data
US 2024/0234057 A1 Jul. 11, 2024

(51) Int. Cl.
*H01H 33/53* (2006.01)
*H01H 33/66* (2006.01)

(52) U.S. Cl.
CPC ........ *H01H 33/53* (2013.01); *H01H 33/6606* (2013.01)

(58) Field of Classification Search
CPC .... H01H 33/53; H01H 33/6606; H01H 33/66; H01H 33/14; H01H 33/166; H01H 33/666; H01H 2033/146; H01H 2033/6667
(Continued)

(56) References Cited

U.S. PATENT DOCUMENTS 3,300,609 A * 1/1967 Flurscheim ............ H01H 33/02 218/4
4,489,291 A * 12/1984 Toyoda .................... H01C 7/18 338/215
(Continued)

FOREIGN PATENT DOCUMENTS

FR 1395289 A 7/1965
GB 1084543 A 9/1967
(Continued)

OTHER PUBLICATIONS

International Search Report (PCT/ISA/210) with translation and Written Opinion mailed on Sep. 21, 2021, by the Japanese Patent Office as the International Searching Authority for International Application No. PCT/JP2021/027312. (10 pages).
(Continued)

*Primary Examiner* — William A Bolton
(74) *Attorney, Agent, or Firm* — BUCHANAN, INGERSOLL & ROONEY PC

(57) ABSTRACT

A vacuum circuit breaker includes: a plurality of vacuum valves each of which includes: a cylindrical vacuum container; a fixed electrode fixed inside the vacuum container; a movable conductor that protrudes from the inside of the vacuum container to the outside of the vacuum container and is movable in a direction of a center axis of the vacuum container; and a movable electrode that moves together with the movable conductor inside the vacuum container to be capable of being separated from the fixed electrode and coming into contact with the fixed electrode, the plurality of vacuum valves being connected in series with each other; and a cylindrical tank that accommodates the plurality of vacuum valves. The plurality of vacuum valves include at least two vacuum valves adjacent to each other in a direction intersecting a center axis of the tank.

8 Claims, 8 Drawing Sheets

(58) Field of Classification Search
USPC ................. 218/139, 118, 120, 134, 143–145
See application file for complete search history.

(56) References Cited

U.S. PATENT DOCUMENTS

| | | | | |
|---|---|---|---|---|
| 5,245,145 | A * | 9/1993 | Freeman | H01H 33/166 338/20 |
| 5,457,294 | A * | 10/1995 | Kato | H01H 33/168 338/215 |
| 5,604,340 | A * | 2/1997 | Yamada | H01H 33/16 218/78 |
| 8,426,760 | B2 * | 4/2013 | Holaus | H01H 33/16 218/78 |
| 10,312,038 | B2 | 6/2019 | Suwa | |
| 2009/0067108 | A1 * | 3/2009 | Kruesi | H01C 1/084 361/722 |
| 2018/0005784 | A1 | 1/2018 | Nagatake et al. | |
| 2019/0051474 | A1 | 2/2019 | Suwa | |

FOREIGN PATENT DOCUMENTS

| | | | |
|---|---|---|---|
| GB | 1086179 | A | 10/1967 |
| JP | S58194225 | A | 11/1983 |
| JP | 2001312948 | A | 11/2001 |
| JP | 2015035289 | A | 2/2015 |
| JP | 2016126952 | A | 7/2016 |
| JP | 6156535 | B1 | 7/2017 |

OTHER PUBLICATIONS

Extended European Search Report dated Jul. 12, 2024, issued in the corresponding European Patent Application No. 21950948.6, 8 pages.

* cited by examiner

VACUUM CIRCUIT BREAKER

FIELD

The present disclosure relates to a vacuum circuit breaker including a plurality of vacuum valves.

BACKGROUND

Conventionally, attempts have been made to increase the voltage of a vacuum circuit breaker in order to expand the application range. As one of the vacuum circuit breakers for achieving high voltage, a vacuum circuit breaker having a structure in which a plurality of breaking points are connected in series, that is, a so-called multi-point breaking structure, is known. Patent Literature 1 discloses a vacuum circuit breaker includes a plurality of vacuum valves connected in series with each other. The plurality of vacuum valves are disposed inside a tank.

CITATION LIST

Patent Literature

Patent Literature 1: Japanese Patent Application Laid-open No. 558-194225

SUMMARY OF INVENTION

Problem to be Solved by the Invention

According to the conventional technique disclosed in Patent Literature 1, the plurality of vacuum valves are disposed in one row on a center axis of the circular cylindrical tank. As the number of vacuum valves installed in the vacuum circuit breaker increases, the dimension of the vacuum circuit breaker in a direction of the center axis of the tank inevitably increases by the length of additional vacuum valves. Therefore, according to the conventional technique, the vacuum circuit breaker is significantly increased in size in the direction of the center axis of the tank. As a result, there has been a problem in which a compact configuration is difficult to be achieved.

The present disclosure has been made in view of the above, and an object of the present disclosure is to obtain a vacuum circuit breaker that enables the achievement of a compact configuration.

Means to Solve the Problem

To solve the above problem and achieve an object, a vacuum circuit breaker according to the present disclosure, includes: a plurality of vacuum valves each of which includes: a vacuum container having a cylindrical shape; a fixed electrode fixed inside the vacuum container; a movable conductor protruding from an inside of the vacuum container to an outside of the vacuum container and movable in a direction of a center axis of the vacuum container; and a movable electrode to move together with the movable conductor inside the vacuum container to be capable of being separated from the fixed electrode and coming into contact with the fixed electrode, the plurality of vacuum valves being connected in series with each other; and a tank that has a cylindrical shape and accommodates the plurality of vacuum valves. The plurality of vacuum valves include at least two vacuum valves adjacent to each other in a direction intersecting a center axis of the tank.

Effects of the Invention

The vacuum circuit breaker according to the present disclosure can acquire an effect that a compact configuration can be achieved.

DESCRIPTION OF EMBODIMENT

Hereinafter, a vacuum circuit breaker according to an embodiment will be described in detail with reference to the drawings.

First Embodiment

Figure 1:
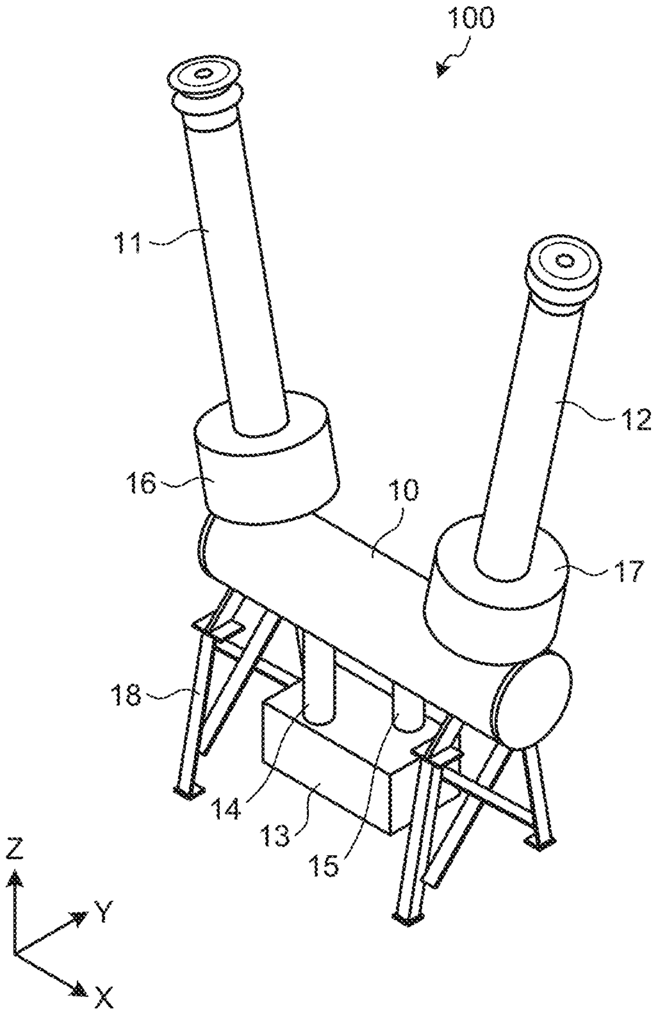
FIG. 1 is a diagram illustrating an external view of a vacuum circuit breaker according to a first embodiment.

FIG. 1 is a diagram illustrating an external view of a vacuum circuit breaker 100 according to a first embodiment. The vacuum circuit breaker 100 includes a cylindrical tank 10, two bushings 11 and 12 erected at upper portions of the tank 10 in a vertical direction, an operation device 13, two tubes 14 and 15 erected at lower portions of the tank 10 in the vertical direction, and two current transformers 16 and 17. The tank 10 includes a circular cylinder made of a metal material and metal flanges that close ends of the circular cylinder. The tank 10 is connected to a reference potential point. An insulating gas is enclosed inside the tank 10. The tank 10 is supported by a frame 18 erected on an installation surface. The current transformer 16 is provided for the bushing 11. The current transformer 17 is provided for the bushing 12. An X axis, a Y axis, and a Z axis are three axes perpendicular to each other. The X axis and the Y axis are horizontal axes. The Z axis is a vertical axis.

Figure 2:
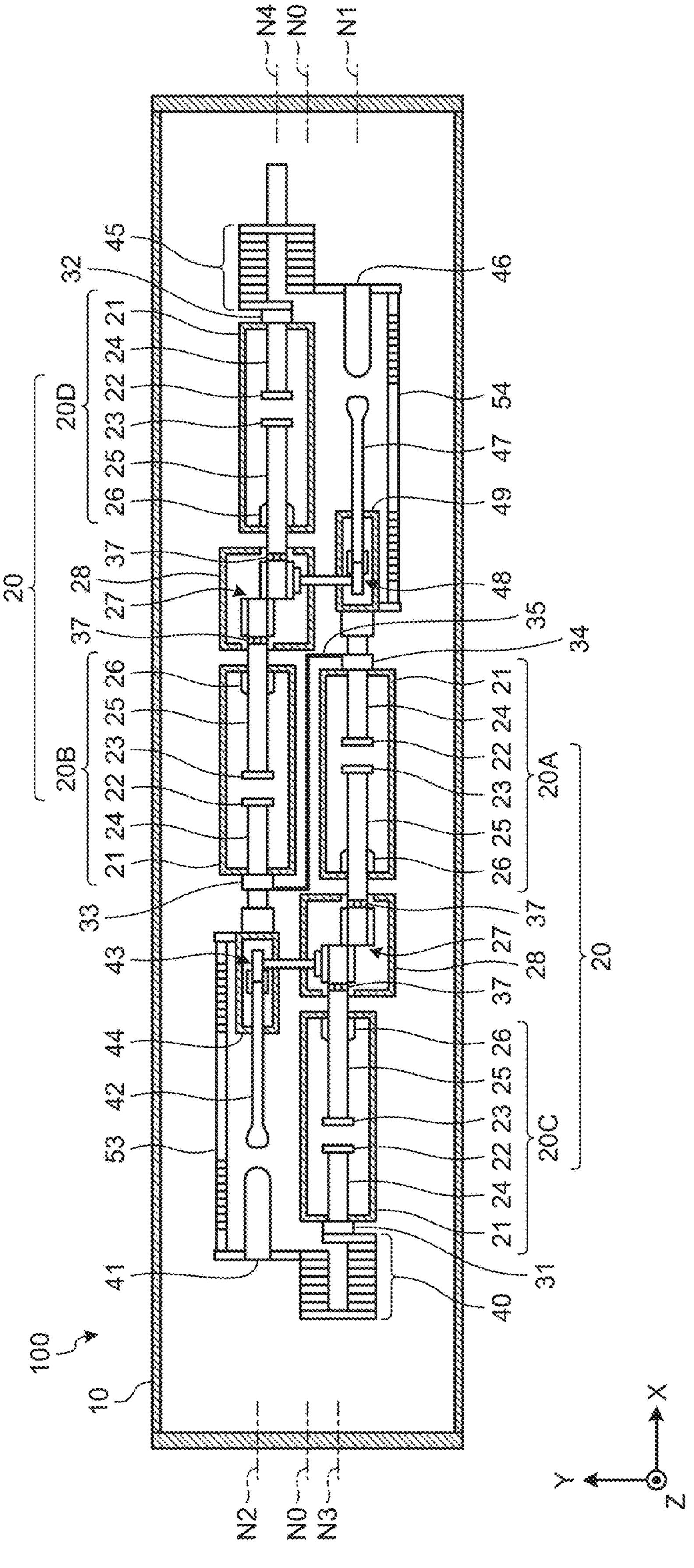
FIG. 2 is a first top view illustrating an internal configuration of a tank of the vacuum circuit breaker according to the first embodiment.
Figure 3:
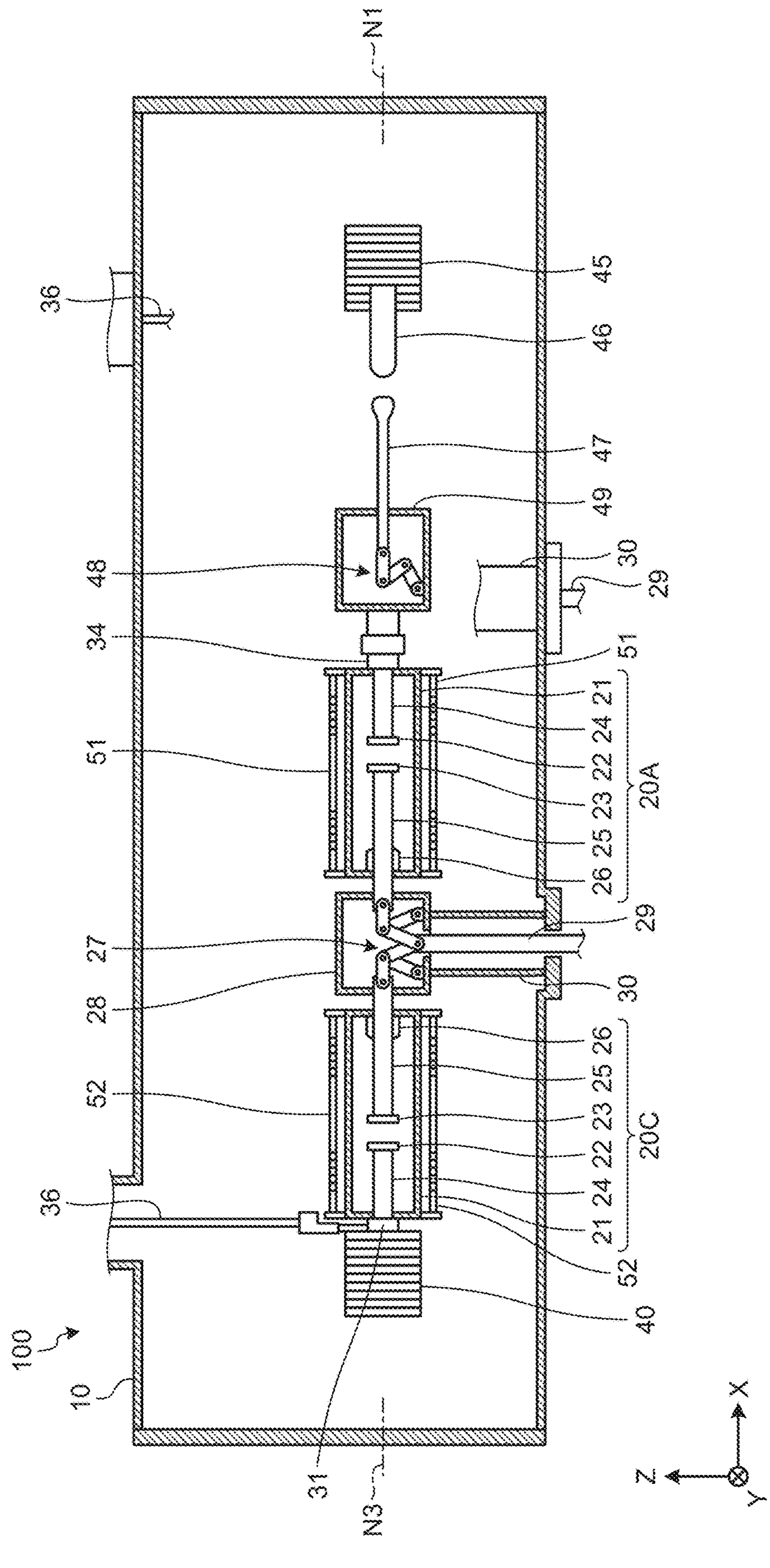
FIG. 3 is a first side view illustrating the internal configuration of the tank of the vacuum circuit breaker according to the first embodiment.
Figure 4:
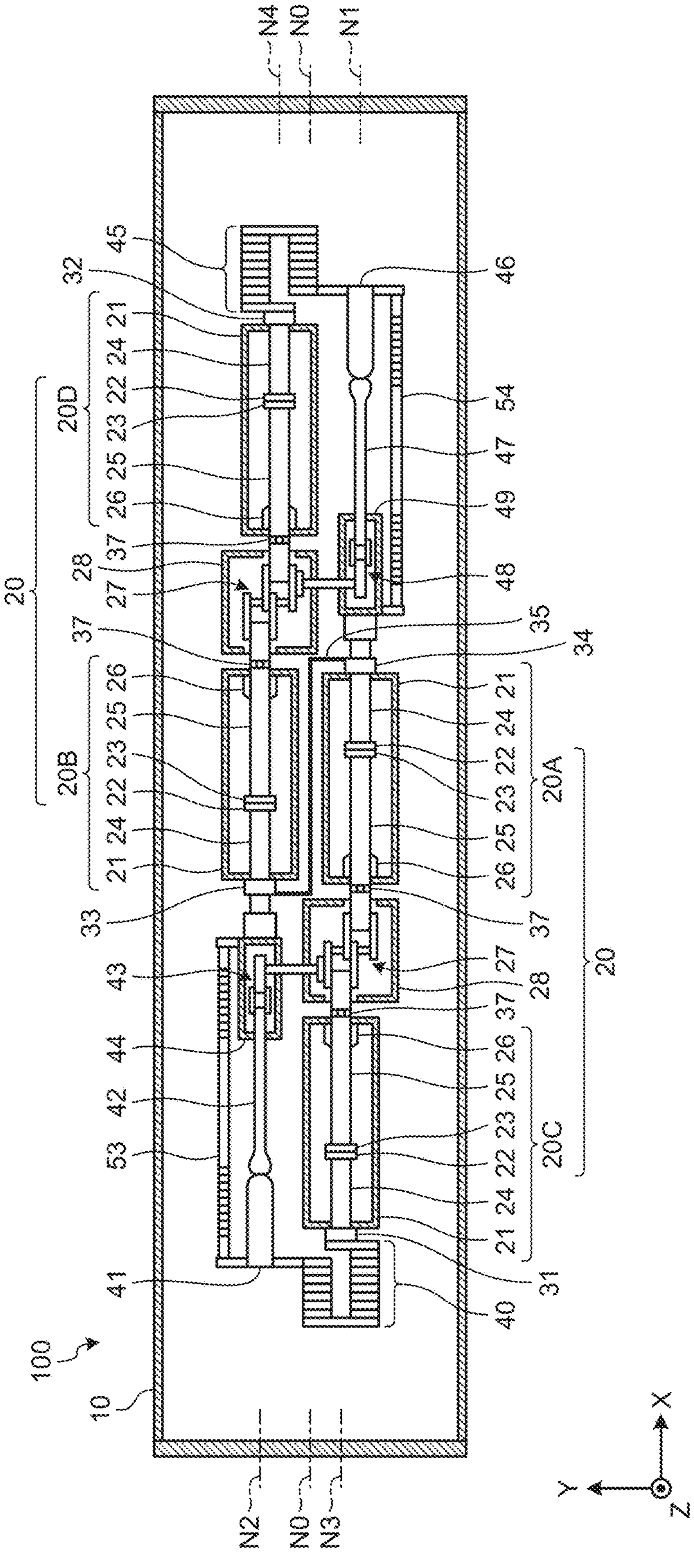
FIG. 4 is a second top view illustrating the internal configuration of the tank of the vacuum circuit breaker according to the first embodiment.

FIG. 2 is a first top view illustrating an internal configuration of the tank 10 of the vacuum circuit breaker 100 according to the first embodiment. FIG. 3 is a first side view illustrating the internal configuration of the tank 10 of the vacuum circuit breaker 100 according to the first embodiment. FIG. 4 is a second top view illustrating the internal configuration of the tank 10 of the vacuum circuit breaker

Figure 5:
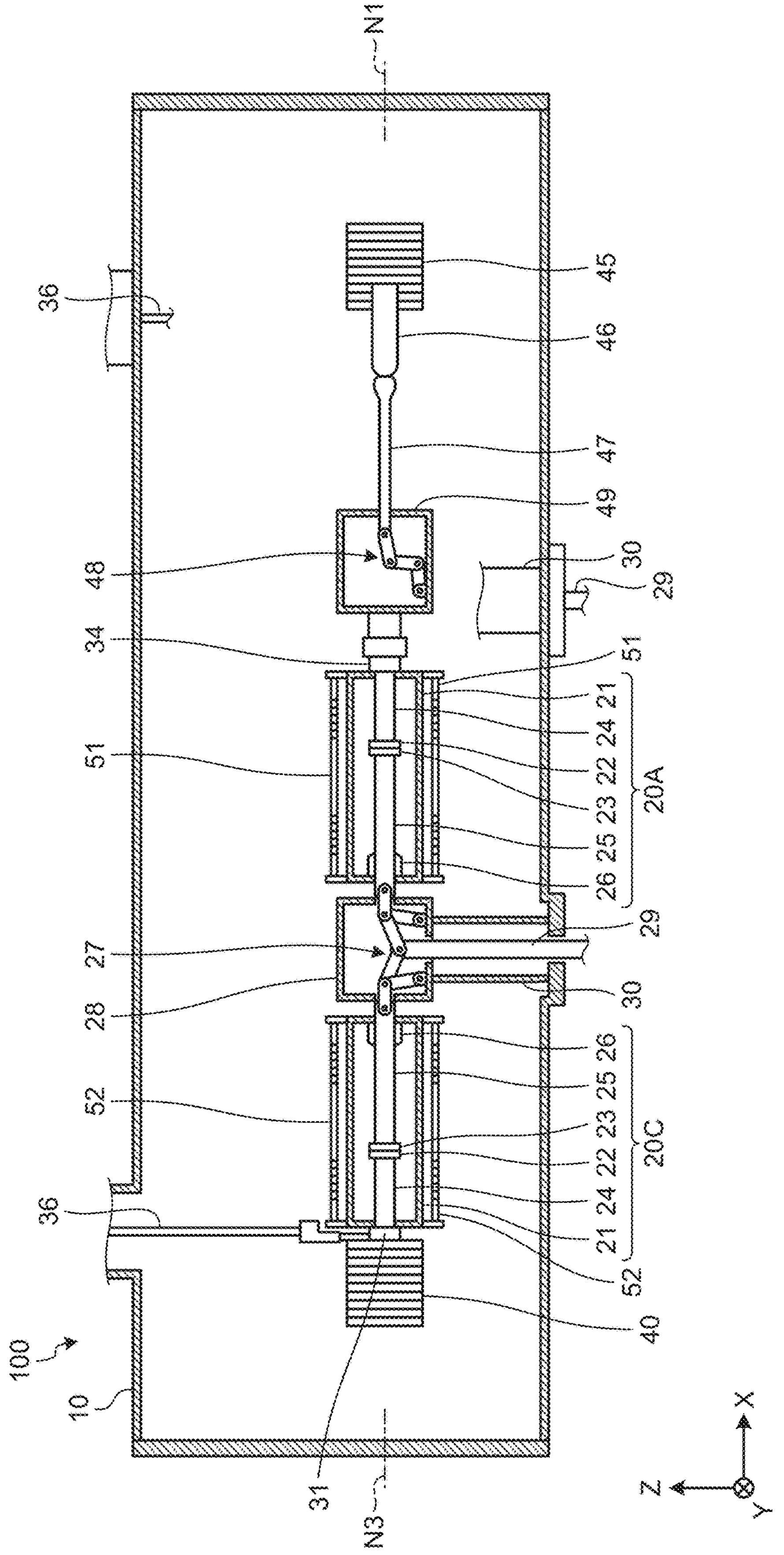
FIG. 5 is a second side view illustrating the internal configuration of the tank of the vacuum circuit breaker according to the first embodiment.

100 according to the first embodiment. FIG. 5 is a second side view illustrating the internal configuration of the tank 10 of the vacuum circuit breaker 100 according to the first embodiment. In FIGS. 2 to 5, some of the constituent elements inside the tank 10 are illustrated in cross section.

The vacuum circuit breaker 100 includes a vacuum valve 20A that is a first vacuum valve, a vacuum valve 20B that is a second vacuum valve, a vacuum valve 20C that is a third vacuum valve, and a vacuum valve 20D that is a fourth vacuum valve. In the following description, when not being distinguished from each other, the four vacuum valves 20A, 20B, 20C, and 20D are each referred to as a vacuum valve 20. Each of the vacuum valves 20 constitutes a breaker unit of the vacuum circuit breaker 100.

Each vacuum valve 20 includes a cylindrical vacuum container 21, a fixed electrode 22 fixed inside the vacuum container 21, and a movable electrode 23 movable inside the vacuum container 21. The fixed electrode 22 and the movable electrode 23 of each vacuum valve 20 constitute a breaking point disposed inside the vacuum container 21. A center axis N0 of the tank 10 and the respective center axes N1, N2, N3, and N4 of the vacuum containers 21 are all parallel to the X axis.

In the following description, in each vacuum valve 20, a state in which the movable electrode 23 is electrically connected to the fixed electrode 22 is referred to as a closed state, and a state in which the connection between the fixed electrode 22 and the movable electrode 23 is interrupted is referred to as an open state. FIGS. 2 and 3 illustrate the vacuum circuit breaker 100 in the open state. FIGS. 4 and 5 illustrate the vacuum circuit breaker 100 in the closed state. In the following description, an operation of the vacuum circuit breaker 100 when the state is changed from the open state to the closed state is referred to as a closing operation, and an operation of the vacuum circuit breaker 100 when the state is changed from the closed state to the open state is referred to as an opening operation. The vacuum circuit breaker 100 closes an electric circuit by the closing operation, and opens the electric circuit by the opening operation. Furthermore, in each vacuum valve 20, a movable electrode 23 side is referred to as a movable side with respect to the fixed electrode 22, and a side opposite to the movable side is referred to as a fixed side.

The vacuum container 21 includes a circular cylinder made of an insulating material and metal flanges that close ends of the circular cylinder. The inside of the vacuum container 21 is maintained at a high vacuum. A fixed conductor 24 is disposed inside the vacuum container 21. The fixed conductor 24 is disposed at a fixed side end of the vacuum container 21. The fixed electrode 22 is fixed to a distal end of the fixed conductor 24. A bellows 26 is disposed at a movable side end of the vacuum container 21 inside the vacuum container 21. A movable conductor 25 penetrates a movable side end of the vacuum container 21, and protrudes from the inside of the vacuum container 21 to the outside of the vacuum container 21. The movable electrode 23 is fixed to a distal end of the movable conductor 25 inside the vacuum container 21. In each vacuum valve 20, the fixed electrode 22, the movable electrode 23, the fixed conductor 24, and the movable conductor 25 are disposed on the center axis of the vacuum container 21.

The movable conductor 25 reciprocates in the direction of the center axis of the vacuum container 21. The movable electrode 23 moves together with the movable conductor 25 inside the vacuum container 21. The bellows 26 expands and contracts, following the movement of the movable conductor 25. During the closing operation, the movable electrode 23 moves toward the fixed side, and comes into contact with the fixed electrode 22. During the opening operation, the movable electrode 23 moves toward the movable side, and is separated from the fixed electrode 22. The vacuum circuit breaker 100 opens and closes the electric circuit by moving the movable electrode 23 inside each vacuum valve 20.

Two link mechanisms 27 are disposed inside the tank 10. Furthermore, two support bushings 30 are provided inside the tank 10. One of the two link mechanisms 27 is connected between the movable conductor 25 of the vacuum valve 20A and the movable conductor 25 of the vacuum valve 20C. The other of the two link mechanisms 27 is connected between the movable conductor 25 of the vacuum valve 20B and the movable conductor 25 of the vacuum valve 20D. Hereinafter, the link mechanism 27 connected between the movable conductor 25 of the vacuum valve 20A and the movable conductor 25 of the vacuum valve 20C is referred to as a first link mechanism, and the link mechanism 27 connected between the movable conductor 25 of the vacuum valve 20B and the movable conductor 25 of the vacuum valve 20D is referred to as a second link mechanism. A contact pressure spring 37 for applying a contact pressure to the fixed electrode 22 and the movable electrode 23 is provided between each movable conductor 25 and the link mechanism 27. In FIGS. 3 and 5, illustrations of the contact pressure springs 37 are omitted.

The first link mechanism is accommodated in a case 28. The case 28 of the first link mechanism is supported by a first support bushing that is one of the two support bushings 30. The first link mechanism moves the movable conductor 25 of the vacuum valve 20A and the movable conductor 25 of the vacuum valve 20C.

The second link mechanism is accommodated in a case 28. The case 28 of the second link mechanism is supported by a second support bushing that is the other of the two support bushings 30. The second link mechanism moves the movable conductor 25 of the vacuum valve 20B and the movable conductor 25 of the vacuum valve 20D.

As illustrated in FIGS. 3 and 5, the vacuum circuit breaker 100 includes two operating rods 29. Each operating rod 29 is made of an insulating material. A first operating rod that is one of the two operating rods 29 is disposed so as to pass through the inside of the tube 14 and the inside of the first support bushing. One end of the first operating rod is connected to the operation device 13. An opposite end of the first operating rod is connected to the first link mechanism. The operation device 13 operates the movable conductor 25 of the vacuum valve 20A and the movable conductor 25 of the vacuum valve 20C via the first operating rod and the first link mechanism.

A second operating rod that is the other of the two operating rods 29 is disposed so as to pass through the inside of the tube 15 and the inside of the second support bushing. One end of the second operating rod is connected to the operation device 13. An opposite end of the second operating rod is connected to the second link mechanism. The operation device 13 operates the movable conductor 25 of the vacuum valve 20B and the movable conductor 25 of the vacuum valve 20D via the second operating rod and the second link mechanism. The vacuum circuit breaker 100 performs the closing operation and the opening operation by operating the movable conductors 25 of the respective vacuum valves 20 by the operation device 13.

The fixed side end of the fixed conductor 24 of the vacuum valve 20A is connected to a connection point 34. The fixed side end of the fixed conductor 24 of the vacuum valve 20B is connected to a connection point 33. An internal conductor 35 electrically connects the connection point 33 and the connection point 34.

The fixed side end of the fixed conductor 24 of the vacuum valve 20C is connected to a breaker unit terminal 31 that is a first terminal. The breaker unit terminal 31 is one terminal of the breaker unit constituted of the four vacuum valves 20. The vacuum valve 20C and the link mechanism 27 that is the first link mechanism are connected between the breaker unit terminal 31 and the vacuum valve 20A.

The fixed side end of the fixed conductor 24 of the vacuum valve 20D is connected to a breaker unit terminal 32 that is a second terminal. The breaker unit terminal 32 is the other terminal of the breaker unit constituted of the four vacuum valves 20. The vacuum valve 20D and the link mechanism 27 that is the second link mechanism are connected between the breaker unit terminal 32 and the vacuum valve 20B.

As illustrated in FIGS. 3 and 5, the vacuum circuit breaker 100 includes two external conductors 36. Each external conductor 36 protrudes from the tank 10. A first external conductor that is one of the two external conductors 36 is disposed so as to pass through the inside of the bushing 11 illustrated in FIG. 1. The current transformer 16 illustrated in FIG. 1 detects a current flowing through the first external conductor. A second external conductor that is the other of the two external conductors 36 is disposed so as to pass through the inside of the bushing 12 illustrated in FIG. 1. The current transformer 17 illustrated in FIG. 1 detects a current flowing through the second external conductor. An end of the first external conductor on the vertically lower side is connected to the breaker unit terminal 31. An end of the second external conductor on the vertically lower side is connected to the breaker unit terminal 32.

The vacuum circuit breaker 100 includes two resistors 40 and 45, a fixed contact 41 and a movable contact 42 constituting a first opening/closing unit, a fixed contact 46 and a movable contact 47 constituting a second opening/closing unit, and two link mechanisms 43 and 48. The resistor 40 that is a first resistor is connected to the breaker unit terminal 31. The resistor 45 that is a second resistor is connected to the breaker unit terminal 32. The resistors 40 and 45 reduce the inrush current flowing through each vacuum valve 20. The first opening/closing unit and the second opening/closing unit are opening/closing units that open and close a circuit including the resistor 40 and the resistor 45.

The fixed contact 41 is connected to the resistor 40. The movable contact 42 is connected to the link mechanism 43. The link mechanism 43 is connected to the link mechanism 27 that is the first link mechanism. The link mechanism 43 is accommodated in a case 44. The case 44 is connected to the connection point 33. The link mechanism 43 operates in conjunction with the first link mechanism, so that the movable contact 42 reciprocates in the direction of the center axis N0. The movement of the movable contact 42 changes the state of the first opening/closing unit between a state in which a distal end of the movable contact 42 is in contact with a distal end of the fixed contact 41 and a state in which the distal end of the movable contact 42 is separated from the distal end of the fixed contact 41.

The fixed contact 46 is connected to the resistor 45. The movable contact 47 is connected to the link mechanism 48. The link mechanism 48 is connected to the link mechanism 27 that is the second link mechanism. The link mechanism 48 is accommodated in a case 49. The case 49 is connected to the connection point 34. The link mechanism 48 operates in conjunction with the second link mechanism, so that the movable contact 47 reciprocates in the direction of the center axis N0. The movement of the movable contact 47 changes the state of the second opening/closing unit between a state in which a distal end of the movable contact 47 is in contact with a distal end of the fixed contact 46 and a state in which the distal end of the movable contact 47 is separated from the distal end of the fixed contact 46.

The vacuum circuit breaker 100 includes first voltage dividing capacitors provided in parallel with the respective four vacuum valves 20, a second voltage dividing capacitor, and a third voltage dividing capacitor. The first voltage dividing capacitors include voltage dividing capacitors 51 provided in parallel with the vacuum valve 20A, voltage dividing capacitors 51 provided in parallel with the vacuum valve 20B, voltage dividing capacitors 52 provided in parallel with the vacuum valve 20C, and voltage dividing capacitors 52 provided in parallel with the vacuum valve 20D.

The vacuum valve 20A is provided with an arbitrary number of voltage dividing capacitors 51. FIGS. 3 and 5 illustrate two of a plurality of voltage dividing capacitors 51 provided for the vacuum valve 20A. The vacuum valve 20B is provided with an arbitrary number of voltage dividing capacitors 51. In FIGS. 3 and 5, the vacuum valve 20B and the voltage dividing capacitors 51 provided for the vacuum valve 20B are disposed in the back of the vacuum valves 20A and 20C in the depth direction of the paper.

The vacuum valve 20C is provided with an arbitrary number of voltage dividing capacitors 52. FIGS. 3 and 5 illustrate two of a plurality of voltage dividing capacitors 52 provided for the vacuum valve 20C. The vacuum valve 20D is provided with an arbitrary number of voltage dividing capacitors 52. In FIGS. 3 and 5, the vacuum valve 20D and the voltage dividing capacitors 52 provided for the vacuum valve 20D are disposed in the back of the vacuum valves 20A and 20C in the depth direction of the paper.

A voltage dividing capacitor 53 that is the second voltage dividing capacitor is provided in parallel with the fixed contact 41 and the movable contact 42 that are the first opening/closing unit and the case 44. A voltage dividing capacitor 54 that is the third voltage dividing capacitor is provided in parallel with the fixed contact 46 and the movable contact 47 that are the second opening/closing unit and the case 49. The vacuum circuit breaker 100 is provided with one or a plurality of voltage dividing capacitors 53 and one or a plurality of voltage dividing capacitors 54. FIGS. 3 and 5 illustrate a mode in which one voltage dividing capacitor 53 and one voltage dividing capacitor 54 are provided.

Next, a first feature of the vacuum circuit breaker 100 according to the first embodiment will be described. The four vacuum valves 20 of the vacuum circuit breaker 100 are connected in series with each other. From among the four vacuum valves 20, the vacuum valve 20A and the vacuum valve 20B are adjacent to each other in the Y axis direction that is a direction intersecting the center axis N0 of the tank 10. The vacuum valve 20A and the vacuum valve 20B are connected in series with the internal conductor 35 interposed therebetween. The vacuum valve 20A and the vacuum valve 20C are adjacent to each other with the link mechanism 27 interposed therebetween in the direction of the center axis N0. The vacuum valve 20B and the vacuum valve 20D are adjacent to each other with the link mechanism 27 interposed therebetween in the direction of the center axis N0.

The center axis N1 of the vacuum valve 20A is shifted from the center axis N0 toward a first direction. The first direction is an opposite direction to a direction of an arrow representing the Y axis in FIGS. 2 to 5. The center axis N2 of the vacuum valve 20B is shifted from the center axis N0 toward a second direction. The second direction is a direction opposite to the first direction. In this manner, the position of the vacuum valve 20A and the position of the vacuum valve 20B are displaced in opposite directions from each other with respect to the center axis N0.

The vacuum valve 20A and the vacuum valve 20B are adjacent to each other in the Y axis direction, so that the dimension of the vacuum circuit breaker 100 in the direction of the center axis N0 can be shortened as compared with an example where all the four vacuum valves 20 are arranged in the direction of the center axis N0. Therefore, an increase in the dimension of the vacuum circuit breaker 100 in the direction of the center axis N0 can be reduced, and a compact configuration can be achieved.

Next, a second feature of the vacuum circuit breaker 100 according to the first embodiment will be described. The fixed contact 41 and the movable contact 42 that constitute the first opening/closing unit are adjacent to the vacuum valve 20B with the link mechanism 43 interposed therebetween in the direction of the center axis N0. Furthermore, the fixed contact 41 and the movable contact 42 are adjacent to the vacuum valve 20C in the Y axis direction. The fixed contact 46 and the movable contact 47 that constitute the second opening/closing unit are adjacent to the vacuum valve 20A with the link mechanism 48 interposed therebetween in the direction of the center axis N0. Furthermore, the fixed contact 46 and the movable contact 47 are adjacent to the vacuum valve 20D in the Y axis direction. The resistor 40 and the first opening/closing unit are attached to two breaking points of the vacuum valve 20A and the vacuum valve 20C. The resistor 45 and the second opening/closing unit are attached to two breaking points of the vacuum valve 20B and the vacuum valve 20D.

Figure 6:
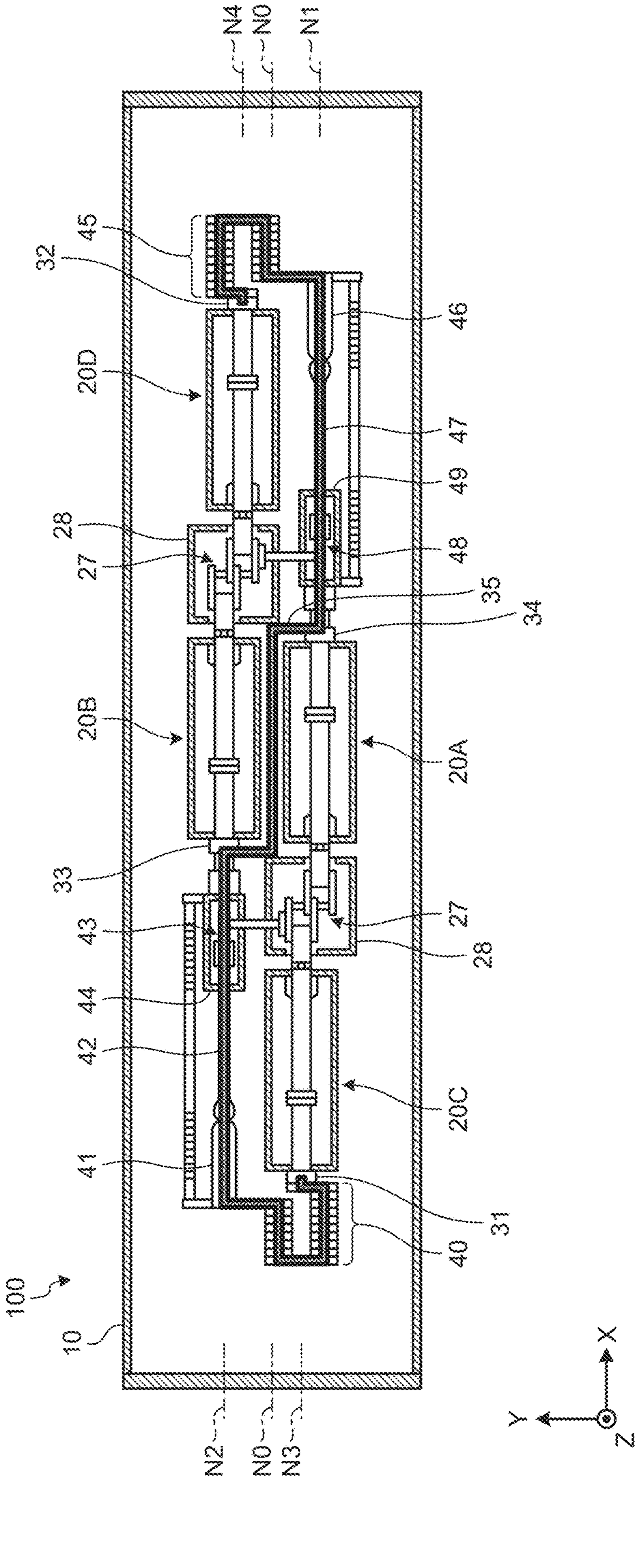
FIG. 6 is a first diagram for describing a current path when the vacuum circuit breaker according to the first embodiment performs a closing operation.

FIG. 6 is a first diagram for describing a current path when the vacuum circuit breaker 100 according to the first embodiment performs the closing operation. When the vacuum circuit breaker 100 performs the closing operation, the first opening/closing unit and the second opening/closing unit are closed before the breaking points of the respective vacuum valves 20 are closed. A bold line with a dotted tone illustrated in FIG. 6 represents the current path when the first opening/closing unit and the second opening/closing unit are closed.

The operation device 13 operates the movable contact 42 via the operating rod 29 and the link mechanisms 27 and 43. With such an operation, the movable contact 42 comes into contact with the fixed contact 41 before the movable electrodes 23 come into contact with the fixed electrodes 22 in the vacuum valves 20A and 20C. The operation device 13 operates the movable contact 47 via the operating rod 29 and the link mechanisms 27 and 48. With such an operation, the movable contact 47 comes into contact with the fixed contact 46 before the movable electrodes 23 come into contact with the fixed electrodes 22 in the vacuum valves 20B and 20D. As a result, the first opening/closing unit and the second opening/closing unit are closed before the breaking points of the respective vacuum valves 20 are closed. When the first opening/closing unit and the second opening/closing unit are closed, a path passing through the resistors 40 and 45, the first opening/closing unit, the second opening/closing unit, and the internal conductor 35 is formed between the breaker unit terminal 31 and the breaker unit terminal 32. A current flows through such a path.

Figure 7:
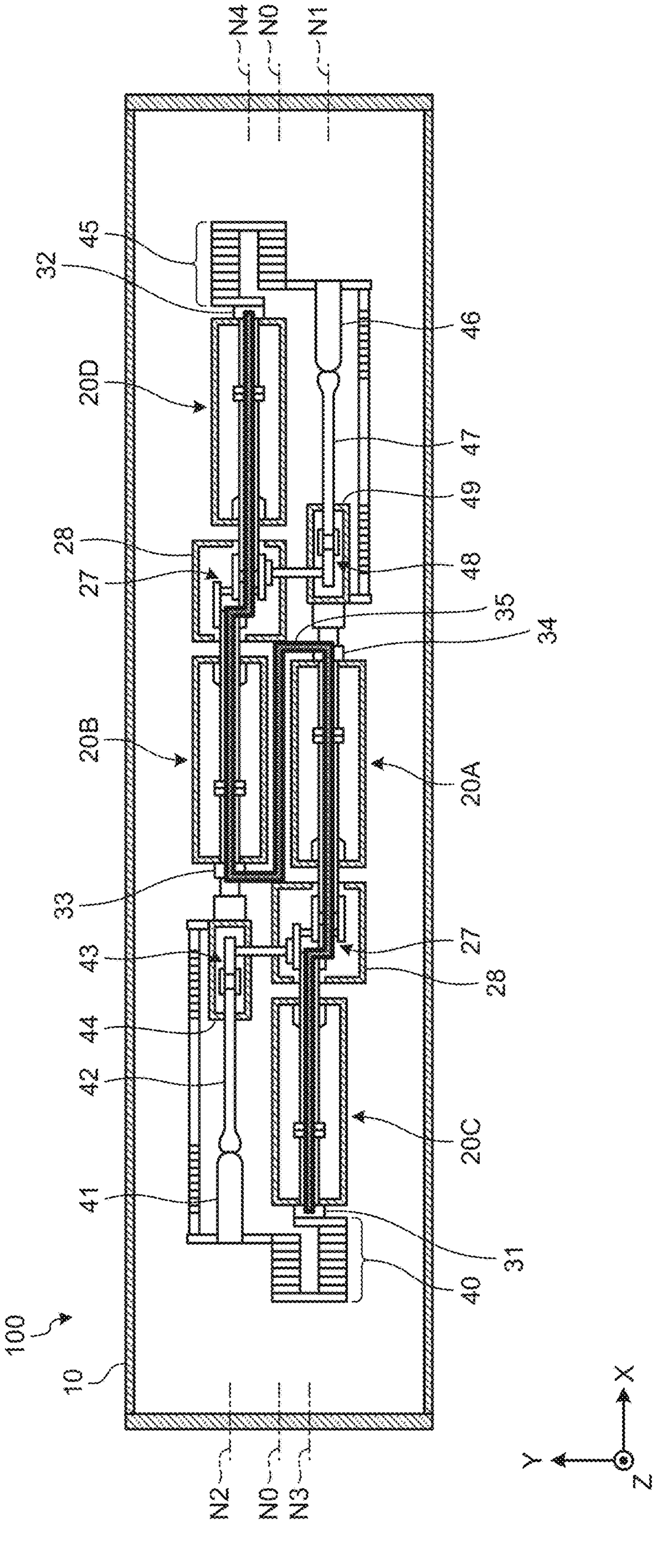
FIG. 7 is a second diagram for describing a current path when the vacuum circuit breaker according to the first embodiment performs the closing operation.

FIG. 7 is a second diagram for describing a current path when the vacuum circuit breaker 100 according to the first embodiment performs the closing operation. A bold line with a dotted tone illustrated in FIG. 7 represents a current path when the breaking points of the respective vacuum valves 20 are closed after the first opening/closing unit and the second opening/closing unit are closed.

After the movable contact 42 comes into contact with the fixed contact 41 and the movable contact 47 comes into contact with the fixed contact 46, the movable electrodes 23 come into contact with the fixed electrodes 22 in the respective vacuum valves 20. As a result, as illustrated in FIG. 7, a current path passing through each of the vacuum valves 20 and the internal conductor 35 is formed between the breaker unit terminal 31 and the breaker unit terminal 32. The resistance of the path illustrated in FIG. 7 is lower than the resistance of the path illustrated in FIG. 6, so that a current flows through the path illustrated in FIG. 7.

As illustrated in FIG. 6, when a current flows through the path including the resistors 40 and 45, the current value of the current flowing between the breaker unit terminal 31 and the breaker unit terminal 32 is reduced by the resistors 40 and 45. The current, the current value of which is reduced by the path illustrated in FIG. 6, flows through the path illustrated in FIG. 7 when the breaking points of the respective vacuum valves 20 are closed. As a result, the vacuum circuit breaker 100 can reduce the inrush current when the electric circuit is connected. The vacuum circuit breaker 100 can reduce the load on the entire power system including the vacuum circuit breaker 100 by reducing the inrush current. Furthermore, the vacuum circuit breaker 100 can reduce the load experienced by the constituent elements of the vacuum circuit breaker 100 by reducing the inrush current.

Since the vacuum valve 20A and the vacuum valve 20B are arranged in the Y axis direction, a space where no vacuum valve 20 is disposed is created on a side opposite to the vacuum valve 20C as viewed from the vacuum valve 20A. The fixed contact 46 and the movable contact 47 are disposed by utilizing such a space. Furthermore, a space where no vacuum valve 20 is disposed is created on a side opposite to the vacuum valve 20D as viewed from the vacuum valve 20B. The fixed contact 41 and the movable contact 42 are disposed by utilizing such a space. Thus, in the vacuum circuit breaker 100, the fixed contacts 41 and 46 and the movable contacts 42 and 47 can be disposed by effectively making use of the space inside the tank 10, and a compact configuration can be achieved. Furthermore, in the vacuum circuit breaker 100, one opening/closing unit is provided for two vacuum valves 20. Therefore, the number of parts can be reduced as compared with an example where one opening/closing unit is provided for each vacuum valve 20. As a result, the vacuum circuit breaker 100 can reduce the inrush current with a simple configuration.

Next, a third feature of the vacuum circuit breaker 100 according to the first embodiment will be described. The vacuum circuit breaker 100 includes, in addition to the voltage dividing capacitors 51 and 52 provided in parallel with the corresponding vacuum valves 20, the voltage dividing capacitor 53 provided in parallel with the fixed contact 41 and the movable contact 42 and the voltage dividing capacitor 54 provided in parallel with the fixed contact 46 and the movable contact 47. The voltage dividing capacitor 53 is connected between the vacuum valve 20B and the vacuum valve 20C. The voltage dividing capacitor 54 is connected between the vacuum valve 20A and the vacuum valve 20D.

Figure 8:
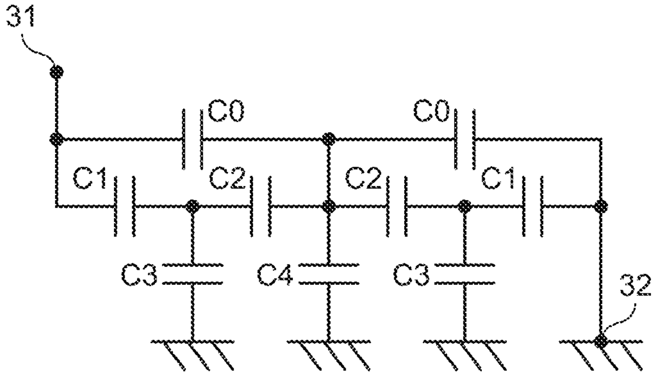
FIG. 8 is a diagram for describing voltage dividing capacitors included in the vacuum circuit breaker according to the first embodiment.

FIG. 8 is a diagram for describing the voltage dividing capacitors 51, 52, 53, and 54 included in the vacuum circuit breaker 100 according to the first embodiment. FIG. 8 schematically illustrates current paths between the breaker unit terminal 31 and the breaker unit terminal 32, and electrostatic capacitances in the paths.

Each of the electrostatic capacitances of the voltage dividing capacitor 53 and the voltage dividing capacitor 54 is defined as C0. Each of the electrostatic capacitances of the voltage dividing capacitors 52 provided in parallel with the vacuum valve 20C and the vacuum valve 20D is defined as C1. Each of the electrostatic capacitances of the dividing capacitors 51 provided in parallel with the vacuum valve 20A and the vacuum valve 20B is defined as C2. Each of the electrostatic capacitances C3 and C4 represents a floating capacitance with the ground, and is defined as an electrostatic capacitance that does not depend on an actual capacitor. For example, the electrostatic capacitance C0 is 400 pF, the electrostatic capacitance C1 is 800 pF, the electrostatic capacitance C2 is 960 pF, the electrostatic capacitance C3 is 120 pF, and the electrostatic capacitance C4 is 150 pF.

In this case, when a voltage applied between the breaker unit terminal 31 and the breaker unit terminal 32 is defined as 1 PU, for example, a voltage applied to the vacuum valve 20A is 0.21 PU, a voltage applied to the vacuum valve 20B is 0.22 PU, a voltage applied to the vacuum valve 20C is 0.35 PU, and a voltage applied to the vacuum valve 20D is 0.25 PU.

The vacuum circuit breaker 100 includes, not only the voltage dividing capacitors 51 and 52 provided in parallel with the corresponding vacuum valves 20, but also the voltage dividing capacitor 53 connected between the vacuum valve 20B and the vacuum valve 20C and the voltage dividing capacitor 54 connected between the vacuum valve 20A and the vacuum valve 20D. The vacuum circuit breaker 100 can equalize voltages applied to vacuum valves 20 as compared with an example where the voltage dividing capacitors 53 and 54 are not provided.

Since the voltages applied to the vacuum valves 20 can be equalized, the insulation distance between the vacuum valves 20 can be shortened. The insulation distance is a spatial distance required for insulation between portions to which a voltage is applied. The insulation distance between the vacuum valve 20A and the vacuum valve 20B adjacent to each other in the Y axis direction can be shortened, so that the diameter of the tank 10 can be shortened. Since the diameter of the tank 10 of the vacuum circuit breaker 100 can be shortened, a compact configuration can be achieved.

Note that the number of vacuum valves 20 provided in the vacuum circuit breaker 100 is not limited to four. It is sufficient that the vacuum circuit breaker 100 includes a plurality of vacuum valves 20, and at least two vacuum valves 20 adjacent to each other in the direction intersecting the center axis N0. The vacuum circuit breaker 100 includes at least two vacuum valves 20 adjacent to each other in the direction intersecting the center axis N0, so that it is possible to acquire an effect that a compact configuration can be achieved.

The configuration described in the above embodiment is an example of the contents of the present disclosure. The configuration of the embodiment can be combined with another known technique. A part of the configuration of the embodiment can be omitted or changed without departing from the gist of the present disclosure.

REFERENCE SIGNS LIST

10 tank; 11, 12 bushing; 13 operation device; 14, 15 tube; 16, 17 current transformer; 18 frame; 20, 20A, 20B, 20C, 20D vacuum valve; 21 vacuum container; 22 fixed electrode; 23 movable electrode; 24 fixed conductor; 25 movable conductor; 26 bellows; 27, 43, 48 link mechanism; 28, 44, 49 case; 29 operating rod; 30 support bushing; 31, 32 breaker unit terminal; 33, 34 connection point; 35 internal conductor; 36 external conductor; 37 contact pressure spring; 40, 45 resistor; 41, 46 fixed contact; 42, 47 movable contact; 51, 52, 53, 54 voltage dividing capacitor; 100 vacuum circuit breaker; N0, N1, N2, N3, N4 center axis.

The invention claimed is:

1. A vacuum circuit breaker, comprising:

a plurality of vacuum valves each of which includes: a vacuum container having a cylindrical shape; a fixed electrode fixed inside the vacuum container; a movable conductor protruding from an inside of the vacuum container to an outside of the vacuum container and movable in a direction of a center axis of the vacuum container; and a movable electrode to move together with the movable conductor inside the vacuum container to be capable of being separated from the fixed electrode and coming into contact with the fixed electrode, the plurality of vacuum valves being connected in series with each other:

a tank that has a cylindrical shape and accommodates the plurality of vacuum valves;

a first external conductor protruding from the tank and connected to a first terminal that is one terminal of a breaker unit constituted of the plurality of vacuum valves:

a second external conductor protruding from the tank and connected to a second terminal that is another terminal of the breaker unit;

a first resistor connected to the first terminal;

a second resistor connected to the second terminal; and an opening/closing unit to open and close a circuit including the first resistor and the second resistor, wherein the plurality of vacuum valves include at least two vacuum valves adjacent to each other in a direction intersecting a center axis of the tank, the plurality of vacuum valves include a first vacuum valve and a second vacuum valve adjacent to each other in the direction intersecting the center axis of the tank and connected in series with each other, the center axis of the vacuum container included in the first vacuum valve is shifted from the center axis of the tank toward a first direction, the center axis of the vacuum container included in the second vacuum valve is shifted from the center axis of the tank toward a second direction opposite to the first direction, the plurality of vacuum valves include:

a third vacuum valve connected between the first vacuum valve and the first terminal, the third vacuum valve and the first vacuum valve being adjacent to each other in a direction of the center axis of the tank; and a fourth vacuum valve connected between the second vacuum valve and the second terminal, the fourth vacuum valve and the second vacuum valve being adjacent to each other in the direction of the center axis of the tank, and the opening/closing unit includes:

a first opening/closing unit adjacent to the second vacuum valve in the direction of the center axis of the tank and adjacent to the third vacuum valve in the direction intersecting the center axis of the tank; and a second opening/closing unit adjacent to the first vacuum valve in the direction of the center axis of the tank and adjacent to the fourth vacuum valve in the direction intersecting the center axis of the tank.

2. The vacuum circuit breaker according to claim 1, comprising:

a first link mechanism connected between the movable conductor of the first vacuum valve and the movable conductor of the third vacuum valve, the first link mechanism to move the movable conductor of the first vacuum valve and the movable conductor of the third vacuum valve; and a second link mechanism connected between the movable conductor of the second vacuum valve and the movable conductor of the fourth vacuum valve, the second link mechanism to move the movable conductor of the second vacuum valve and the movable conductor of the fourth vacuum valve.

3. A vacuum circuit breaker, comprising:

a plurality of vacuum valves each of which includes: a vacuum container having a cylindrical shape; a fixed electrode fixed inside the vacuum container; a movable conductor protruding from an inside of the vacuum container to an outside of the vacuum container and movable in a direction of a center axis of the vacuum container; and a movable electrode to move together with the movable conductor inside the vacuum container to be capable of being separated from the fixed electrode and coming into contact with the fixed electrode, the plurality of vacuum valves being connected in series with each other:

a tank that has a cylindrical shape and accommodates the plurality of vacuum valves;

a first external conductor protruding from the tank and connected to a first terminal that is one terminal of a breaker unit constituted of the plurality of vacuum valves;

a second external conductor protruding from the tank and connected to a second terminal that is another terminal of the breaker unit;

a first resistor connected to the first terminal;

a second resistor connected to the second terminal; and an opening/closing unit to open and close a circuit including the first resistor and the second resistor, wherein the plurality of vacuum valves include at least two vacuum valves adjacent to each other in a direction intersecting a center axis of the tank, the plurality of vacuum valves include a first vacuum valve and a second vacuum valve adjacent to each other in the direction intersecting the center axis of the tank and connected in series with each other, the center axis of the vacuum container included in the first vacuum valve is shifted from the center axis of the tank toward a first direction, the center axis of the vacuum container included in the second vacuum valve is shifted from the center axis of the tank toward a second direction opposite to the first direction, the plurality of vacuum valves include:

a third vacuum valve connected between the first vacuum valve and the first terminal; and a fourth vacuum valve connected between the second vacuum valve and the second terminal, and the opening/closing unit includes:

a first opening/closing unit adjacent to the second vacuum valve in a direction of the center axis of the tank and adjacent to the third vacuum valve in the direction intersecting the center axis of the tank; and a second opening/closing unit adjacent to the first vacuum valve in the direction of the center axis of the tank and adjacent to the fourth vacuum valve in the direction intersecting the center axis of the tank, the vacuum circuit breaker further comprising:

a first voltage dividing capacitor provided in parallel with each of the plurality of vacuum valves;

a second voltage dividing capacitor connected between the second vacuum valve and the third vacuum valve; and a third voltage dividing capacitor connected between the first vacuum valve and the fourth vacuum valve.

4. The vacuum circuit breaker according to claim 3, comprising:

a first link mechanism connected between the movable conductor of the first vacuum valve and the movable conductor of the third vacuum valve, the first link mechanism to move the movable conductor of the first vacuum valve and the movable conductor of the third vacuum valve; and a second link mechanism connected between the movable conductor of the second vacuum valve and the movable conductor of the fourth vacuum valve, the second link mechanism to move the movable conductor of the second vacuum valve and the movable conductor of the fourth vacuum valve.

5. A vacuum circuit breaker, comprising:

a plurality of vacuum valves each of which includes: a vacuum container having a cylindrical shape; a fixed electrode fixed inside the vacuum container; a movable conductor protruding from an inside of the vacuum container to an outside of the vacuum container and movable in a direction of a center axis of the vacuum container; and a movable electrode to move together with the movable conductor inside the vacuum container to be capable of being separated from the fixed electrode and coming into contact with the fixed electrode, the plurality of vacuum valves being connected in series with each other;

a tank that has a cylindrical shape and accommodates the plurality of vacuum valves;

a first external conductor protruding from the tank and connected to a first terminal that is one terminal of a breaker unit constituted of the plurality of vacuum valves; and a second external conductor protruding from the tank and connected to a second terminal that is another terminal of the breaker unit, wherein the plurality of vacuum valves include a first vacuum valve and a second vacuum valve adjacent to each other in the direction intersecting the center axis of the tank and connected in series with each other, a third vacuum valve connected between the first vacuum valve and the first terminal; and a fourth vacuum valve connected between the second vacuum valve and the second terminal, and wherein the vacuum circuit breaker further comprising:

a first voltage dividing capacitor provided in parallel with each of the plurality of vacuum valves;

a second voltage dividing capacitor connected between the second vacuum valve and the third vacuum valve; and a third voltage dividing capacitor connected between the first vacuum valve and the fourth vacuum valve.

6. The vacuum circuit breaker according to claim 5, wherein the center axis of the vacuum container included in the first vacuum valve is shifted from the center axis of the tank toward a first direction, and the center axis of the vacuum container included in the second vacuum valve is shifted from the center axis of the tank toward a second direction opposite to the first direction.

7. The vacuum circuit breaker according to claim 6, comprising:

a first link mechanism connected between the movable conductor of the first vacuum valve and the movable conductor of the third vacuum valve, the first link mechanism to move the movable conductor of the first vacuum valve and the movable conductor of the third vacuum valve; and a second link mechanism connected between the movable conductor of the second vacuum valve and the movable conductor of the fourth vacuum valve, the second link mechanism to move the movable conductor of the second vacuum valve and the movable conductor of the fourth vacuum valve.

8. The vacuum circuit breaker according to claim 5, comprising:

a first link mechanism connected between the movable conductor of the first vacuum valve and the movable conductor of the third vacuum valve, the first link mechanism to move the movable conductor of the first vacuum valve and the movable conductor of the third vacuum valve; and a second link mechanism connected between the movable conductor of the second vacuum valve and the movable conductor of the fourth vacuum valve, the second link mechanism to move the movable conductor of the second vacuum valve and the movable conductor of the fourth vacuum valve.

* * * * *